Figure 1:
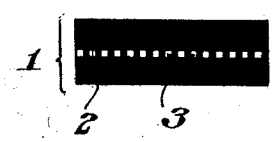

I. KITSÉE.
METHOD AND APPARATUS FOR PRODUCING MATRICES AND FOR PRODUCING COLOR SCREENS THEREFROM.
APPLICATION FILED MAY 10, 1919. RENEWED APR. 11, 1922.

1,426,996.

Patented Aug. 22, 1922.

Witnesses:

Inventor;

UNITED STATES PATENT OFFICE.

ISIDOR KITSÉE, OF PHILADELPHIA, PENNSYLVANIA.

METHOD AND APPARATUS FOR PRODUCING MATRICES AND FOR PRODUCING COLOR SCREENS THEREFROM.

1,426,996.                 Specification of Letters Patent.     Patented Aug. 22, 1922.

Application filed May 10, 1919, Serial No. 296,157. Renewed April 11, 1922. Serial No. 551,673.

*To all whom it may concern:*

Be it known that I, ISIDOR KITSÉE, citizen of the United States, residing at Philadelphia, in the county of Philadelphia and State of Pennsylvania, have invented certain new and useful Improvements in Methods and Apparatus for Producing Matrices and for Producing Color Screens Therefrom, of which the following is a specification.

My invention relates to an improvement in producing matrices and color screens therefrom.

My invention is applicable to the production of color screens integral with blanks for stationary work, which in the nature of the thing are of very restricted dimensions, but my invention also and more specially contemplates the preparation of matrices for moving picture films of desired length. I am aware that today comparatively small plates with integral color screens are produced, but such screens cannot be used for moving picture films for three reasons:—First, on account of their restricted area; second, because the figurations on them are of dimensions too large for the magnification required in moving picture work; third, the small screens, today in the market are all produced with glass as a support, for the reason that it was not considered possible to produce and maintain these screens on a flexible support.

I am also aware that divers patents in claiming screens for moving picture work, describe means of tinting one or the other part with different colors, but none of them describes or shows means to produce commercially the fine figurations on films of required length and the best authorities of today assert, that with present means it is impossible to produce on moving picture films integral color screens of required minute dimensions.

In producing color screens for photography, as it is well known to persons versed in the art, the fundamental necessity is, that the gelatine or like colloidal film, the substratum in fact carried by the celluloid should be changed in such a manner, that predetermined parts shall acquire a selective color affinity. In moving picture work the great necessity is also present that the figurations shall be of dimensions more minute than of the screens of still pictures of today.

When it is considered that every square inch of such film requires (assuming figurations of one one-thousandth of an inch) the formation of about one million of such figurations and when it is considered that the average moving picture reel contains about twelve thousand square inches requiring therefore about twelve billion figurations, the magnitude of the proposition to produce a selectively colored gelatine film for moving picture work and the impossibility of producing such films of required lengths with these figurations by present day methods can easily be understood.

For the purpose of my invention, it is only necessary to produce by mechanical or manual means one line of such small figurations, and to suggest to persons versed in the art, ready means to produce this one line I would advise the following procedure:—On a strip of the paper known in commerce as pin-point or cross-section paper of the desired dimensions, every part is covered with an opaque material such as india ink, with the exception of alternate squares of one line, so that in reality we have an opaque design with only one line of transparent squares, each transparent or translucent square followed by an opaque square, and with the aid of well known means, these squares can easily be photographically reduced to the required minute size of one one-thousandth of an inch or even less. If the paper is not sufficiently transparent the same may be treated with oil. I will now refer to the accompanying drawing and in so doing will describe the method of procedure. But before doing so it is necessary for me to state, that figurations in these drawings are of greater dimensions than in practice, also that the sources of light may differ, and where necessity requires different parts of the device should during the time of exposure be in contact with each other.

With my invention, films as now usually produced, of a width of from twenty to twenty-five inches may be employed to produce the matrix and then, films of the same width may be printed therefrom, but I will here describe my invention as applied to standard individual films.

Figure 2:
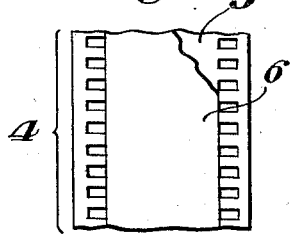
Figure 3:
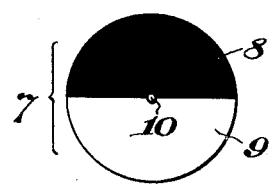
Figure 4:
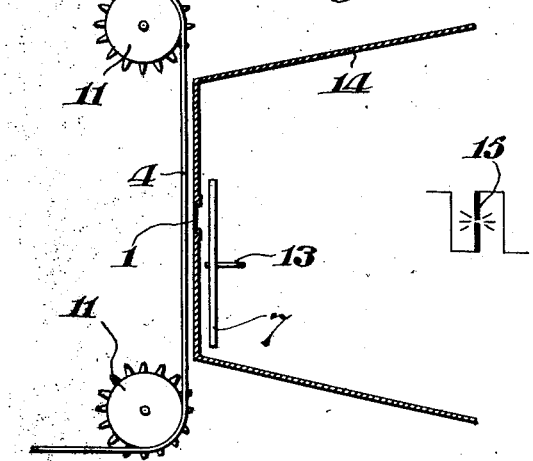
Figure 5:
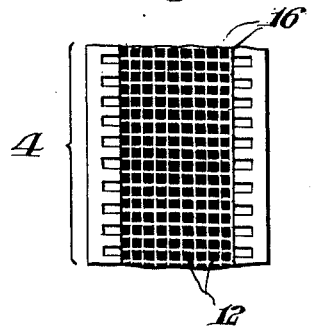
Figure 6:
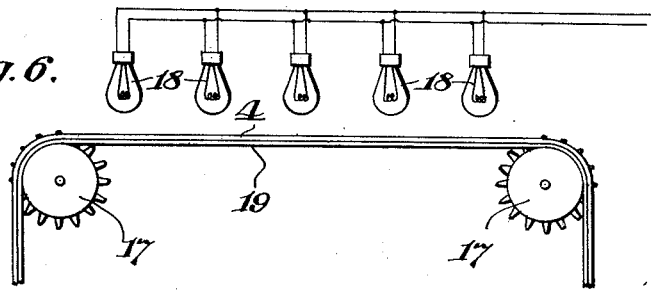
Figures 7, 8:
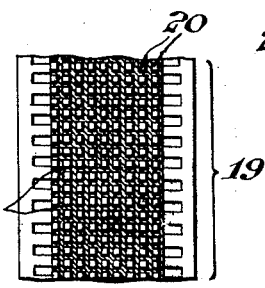

In the drawing Fig. 1, is a plan view of a templet. But for the purpose of more equalizing the area, to be tinted on the film proper with one color with the area on said film to be tinted with a second color I have recourse to the following arrangement:— Instead of producing the line to be photographed, by covering every alternate square of said line with the opaque material, such as india ink, I cover only every third square with this opaque material, leaving two squares uncovered or transparent. In reality therefore, the templet will represent one line of transparent squares, each square double the width of the intervening opaque square, as is illustrated in this figure. Fig. 2, is a plan view of part of a moving picture film provided with a sensitive emulsion. Fig. 3, is a plan view of a revolving disk adapted to be placed throughout the exposure between the source of light and the templet and adapted to be continuously revolved. Fig. 4, is a diagrammatic view partially in section illustrating the method of photographing through the templet, with the interposition of the revolving disk, on the sensitized film. Fig. 5, is a plan view of the film—later on to be used as a matrix—after having gone through the photographic and developing process. Fig. 6, is a diagrammatic view illustrating the printing with the aid of the matrix of a moving picture film provided with a suitable substratum, suitably sensitized. Fig. 7, is a plan view of part of the printed film. Fig. 8, is a side view of Fig. 7, showing the raised squares.

In Fig. 1, 1 is the templet as an entirety of which 2 are the opaque and 3 the transparent parts. As stated above the transparent parts should be of double the width of the opaque parts between said transparent parts. In Fig. 2, 4 indicates the film as an entirely, 5 the celluloid support and 6 the sensitive emulsion. In Fig. 3, 7 is the disk as an entirety of which 8 is the opaque and 9 the transparent part, 10 is the centre hole or nave with the aid of which the disk may be secured to a suitable shaft. In Fig. 4, 4 indicates the film, 11, 11 the means to move the film, 1 indicates the templet, 7 the disk and 13 the revolving shaft on which the disk is placed, 14 indicates the dark chamber and 15 the source of light. In Fig. 5, 4 indicates the film, 12 the opaque figurations and 16 the transparent figurations surrounding said opaque figurations. In Fig. 6, 4 is the film used as a matrix, 19 the film to be printed therefrom, 18 the source of light and 17 the means to move both films in unison. In Fig. 7, 19 is the printed film, after having been developed. In this film 20 are the raised parts and 21 the depressed parts. These depressed parts are here shown as to be colored green. In Fig. 8, 19 is the film proper and 20 indicates the raised parts.

The mode of procedure is as follows:— After the templet is produced, with the transparent figurations, here squares, in required minute dimensions, the same is placed in the dark chamber 8 in position as clearly illustrated in Fig. 4. The sensitized film 4 is then placed in a position, so that the rays of light, penetrating through the transparent parts of the templet impinge upon corresponding parts of the sensitized surface. The film is then moved, say in the direction of the arrow. In so far the procedure is substantially identical with the procedure in the former application filed May 6, 1919 under Serial Number 595,254. But, as the resultant figurations should be individual squares, means have to be provided to obscure the light at predetermined periods, or in other words to prevent at certain predetermined periods the light rays striking the sensitized surface of the moving film through the transparent portions of the templet. To produce this result, I make use of the revolving disk as illustrated in Fig. 3. This disk is placed between the source of light and templet in such relation that through each revolution of the disk, occupying a certain unit of time, one half of the time-unit the light is obscured from the templet through the passing of the opaque half of the disk and one half of the time during each revolution the light rays are not obstructed, because during this half time-unit only the transparent part of the disk intervenes between the source of light and the templet. I have illustrated the disk as consisting of a transparent material, one-half of which is opaqued, but the disk may consist of metal, one-half of which is stamped out or otherwise removed, or the disk may consist of a transparent material, the two halves of which are prepared in a manner so as to permit passage only of predetermined light rays through each half. As an example, it is taken for granted, that each part of the film has to be exposed one-fortieth of a second so as to produce the required photographic action and it is taken for granted, that the transparent squares are one one-thousandth of an inch in length, the film therefore has to travel at a speed about equal to the speed of about one one-thousandth of an inch for each one-fortieth of a second. If now the disk is revolved at the rate of one revolution for each one-twentieth of a second, it follows that for each revolution of this disk the film has traveled two one-thousandths of an inch and as during each revolution of the disk the light is allowed to pass only for one-half of the time and obscured the other half of the time:—it follows, that after each one-thousandth of an inch exposure of the film to the light rays, the film will travel the same distance, that is one one-thousandth of an inch, with the light rays obscured and therefore without any photographic action. The result of these relative movements of the disk and film will result in an alternate exposure of this film to the light rays, and the effect after due developing processes will be, as illustrated in Fig. 5, an interrupted opaque line composed of minute figurations, here squares.

As moving picture films are today produced at about two hundred to four hundred foot lengths, the film, to be used later on as the matrix, should be of a length equal to the length of the film proper on which the screen has to be produced. In fact, the film 4 may be made in an endless band, so as to facilitate the later printing therefrom of the films proper.

After the matrix is finished and it is required to produce therefrom the selectively colored figurations on the moving picture film proper, this moving picture film is provided with a coating of gelatine or other suitable substratum sensitized in a manner so that wherever the light penetrates, during the process of printing onto the sensitized surface, the substratum will become hard and will remain unaffected if immersed in cold water, whereas the part screened from the light rays by the opaque figurations, will swell up through the immersion in water of about normal temperature.

It is now supposed that a proper moving picture film has been printed in the usual manner—has been exposed with the interposition of the matrix to the effect of light rays, and it is supposed that the printed-on film is immersed in water of about normal temperature, then those parts of the substratum which were exposed to the light rays will remain depressed, whereas the parts screened from the light rays and coinciding with the opaque figurations on the matrix will be in relief, as is clearly illustrated in Figs 7 and 8. But an examination of Fig. 7, will reveal the depressed parts as colored green. The reason for this coloration is as follows:—It was found that if a chromated gelatine (or other suitable colloidal substratum, sensitized with a suitable material) is colored with a particular suitable dye-solution and then subjected with the interposition of the matrix to rays of light: in the later process of immersing in water, those parts, unprotected from the rays of light will not only remain depressed, but will also retain the dye or color, whereas the parts protected from the rays of light will not only be raised, but will also discharge the dye or color and become for all practical purposes transparent and colorless.

It was also found that if the film, after the washing process, is subjected to a second dye-solution, (selective and properly compounded) the second solution will only dye or tint the raised, now transparent parts, leaving the depressed parts unaffected.

In Fig. 7, the depressed parts are, as stated above, green, and it is therefore suggested that the second selective dye-solution shall comprise the red color. The finished screen will therefore consist of red figurations surrounded by the complementary color green.

In Fig. 5, I have illustrated the opaque squares as to be arranged in substantially straight lines. In reality, the lines are not entirely straight, but the diversion from the straight line is too minutely small to be noticed.

In reality, the width of the vertical and horizontal lines or spaces should be equal to the width and length of each individual square between said lines, the transparent figurations should therefore, by preference form perfect squares of equal dimensions.

Having now described my invention, what I claim as new and desire to secure by Letters Patent is:—

1. The method of producing photographically a matrix useful for the production of color screens for moving picture films which consists in continuously moving a properly sensitized film in required relation to a fixed templet with one line of minute transparent figurations, transmitting light through said figurations and intermittently screening the light from said transparent figurations.

2. The method of producing with the aid of a templet comprising only one line of inter-spaced transparent figurations a matrix for moving picture work which consists in continuously moving a properly sensitized film in required relation to a fixed templet comprising one line of transparent figurations, transmitting light through said figurations and interposing an opaque material at predetermined periods between the source of light and the templet, during the time that said sensitized film is moving.

3. In a device of the class described a templet having one line of inter-spaced transparent figurations, means to move a properly sensitized film in proper relation to said templet, a source of light adapted to impinge through said transparent figurations onto the sensitized surface of said film and means to estop the light rays from passing through said figurations at predetermined periods.

4. The method of producing photographically a series of individual figurations on a properly sensitized blank which consists in moving said blank in required relation to a stationary templet possessing one line of a series of transparent figurations, during the time that rays of light are transmitted through said figurations, and interposing an opaque shutter or disk intermittently between the rays of light and the transparent figurations of the templet at predetermined periods.

In testimony whereof I affix my signature.

ISIDOR KITSÉE.

Witness:
E. E. MILLER.